Jan. 9, 1940.  J. R. WRATHALL  2,186,225
MOTOR CONTROL SYSTEM
Filed Sept. 8, 1938
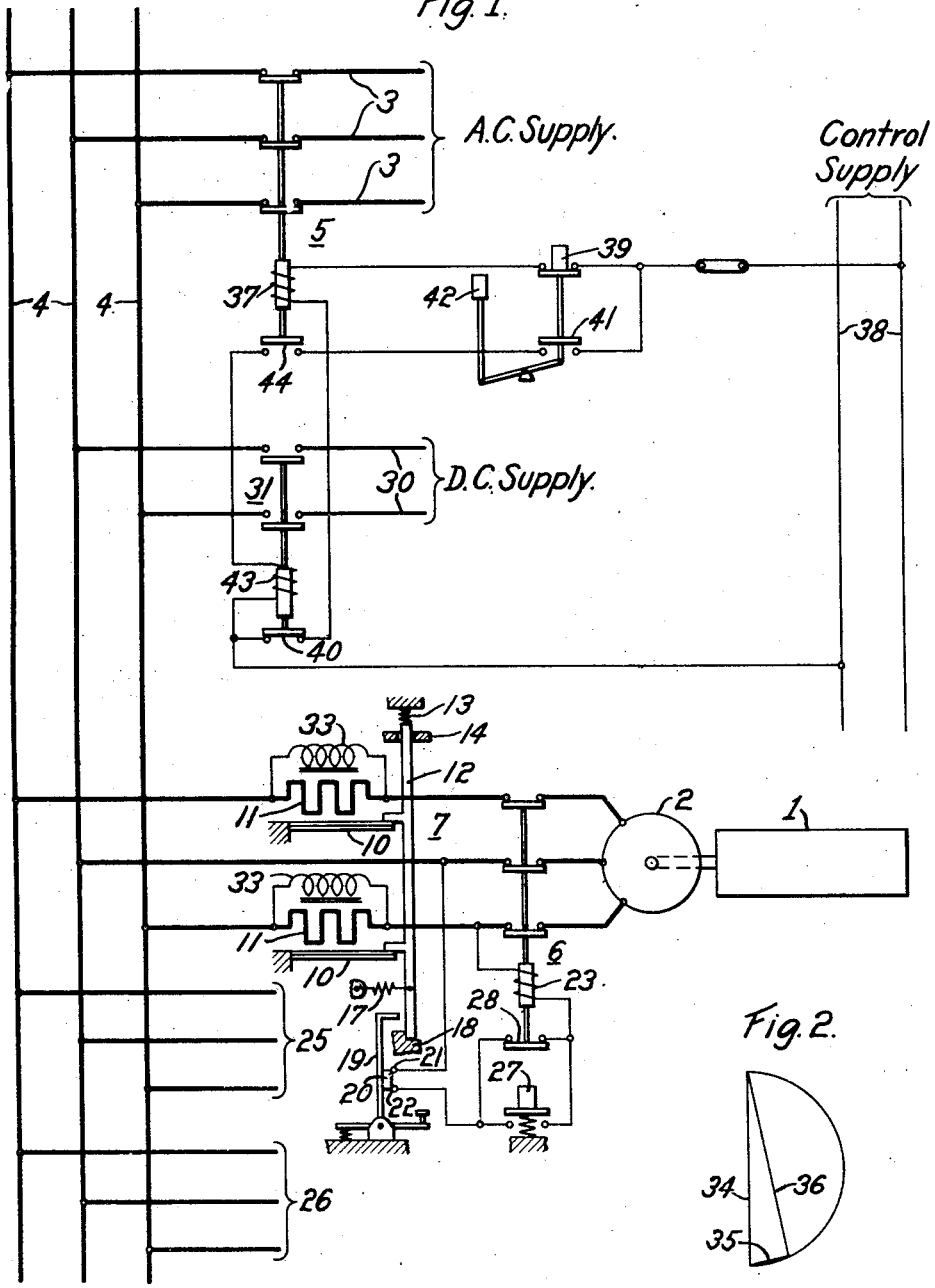
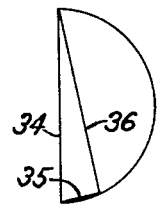
WITNESSES:
INVENTOR.
Jay R. Wrathall.
BY
Paul E. Friedemann
ATTORNEY Patented Jan. 9, 1940

2,186,225

UNITED STATES PATENT OFFICE 2,186,225

MOTOR CONTROL SYSTEM

Jay R. Wrathall, Pittsburgh, Pa., assignor to Westinghouse Electric & Manufacturing Company, East Pittsburgh, Pa., a corporation of Pennsylvania Application September 8, 1938, Serial No. 228,945

6 Claims. (Cl. 172—179)

This invention relates to motor control systems, and particularly to systems for preventing false operation of protective equipment for alternating current motors, when the motors are subjected to superimposed energy other than that required for normal operation, as where direct current energy is applied for dynamic braking.

In the operation of roll-out tables, in steel mills particularly, each table roll is provided with an operating motor, preferably a three-phase induction motor, to provide the driving energy necessary to impart fast movement to the material being moved along on the table. The operating speeds of such rolls have been advanced, during present-day operation, to relatively high values that present a problem in braking, when the motors are to be stopped quickly to bring the movement of the traveling material to a stop.

A satisfactory solution to the problem of applying a braking torque has been found in the application of direct current to one phase of the motor. Because of the high speeds and the momentum involved, however, relatively large braking currents are necessary to obtain the quick stop that is desired.

Since each driving motor is provided with an overload protective device which has been selected to protect the motor against excessive sustained alternating current load currents, the relatively large dynamic braking direct current may at times be large enough to operate the overload devices and to cause false and undesirable tripping of the circuit breakers or switching equipment.

In order to avoid such effect of the dynamic braking direct current, higher settings of the protective devices have been tried, but such settings resulted in a consequent loss of the close degree of protection that is normally desired.

In order to maintain the desired proper close degree of protection, however, it has been felt necessary to provide a different type of protection against the dynamic braking currents, while at the same time retaining a properly engineered application of the protective devices to protect the motors properly against sustained overloads not too far beyond the capacity of the motor.

A primary object of this invention, therefore, is to provide a protective control system that will enable the motors to function normally, with a proper close degree of protection against sustained alternating load currents, while, at the same time, permitting the application of dynamic braking direct currents without causing the overload devices to cause false operations.

In order to enable the overload current-responsive devices to perform their normal function in response to alternating current, and to prevent those devices from responding to the full effect of the dynamic-braking direct current, I provide a reactor in shunt relation with the overload current-responsive device, and design the reactor to have such characteristics as to present a relatively high impedance to the alternating current normally supplied to the motor, but to present a relatively low impedance to the dynamic-braking direct current.

Consequently, during normal operation of the motor, a very small portion of the alternating current will traverse the reactor, and substantially all of the load current will traverse the overload current-responsive device. When the normal operating current is discontinued, and the dynamic-braking direct current is supplied to the motor, the resistance of the reactor will be sufficiently small to direct current, to bypass enough of the braking current around the overload device to keep the current-responsive overload device from being energized to a degree that will be sufficient to operate it to open the motor circuit.

When the braking direct current is to be applied, the motors are normally disconnected from the alternating current source, so that only the braking current will be carried by the overload current responsive element and the paralleling reactor.

A typical system which is modified to operate in accordance with the principles of my invention is illustrated in the accompanying drawing, in which:

Figure 1 is a simple diagram of a motor control system; and

Fig. 2 is a vector diagram showing the current distribution in the elements of a protective relay for each motor.

As shown in Fig. 1, a roll-out table comprises a plurality of adjacent parallel rolls 1 which are provided with individual driving motors 2, that are preferably of the squirrel-cage induction type to provide the ruggedness desired for steel mill work. Operating energy for the gang of motors is supplied from an alternating current source 3 to a bus circuit 4 for the motors, through a circuit interrupter 5. The energy to the individual motors 2 is supplied from the bus circuit 4 through starting switches 6. Associated current-responsive protective devices 7 are provided to open the switches 6 and to disconnect the associated motors from the bus circuit 4 upon occurrence of sustained overload conditions upon the respective motors, beyond the normal or intended capacities of the motors.

The protective device associated with each switch may take any form according to the type or design of the device, and in accordance with its intended function in protecting the motor. By way of illustration, I have shown one form of commercial starting switch which embodies a contactor and a thermal current-responsive device for controlling the holding circuit of the contactor.

The protective device 7, as herein described for the purpose of illustration, consists of a bimetallic heat-responsive bar 10 disposed adjacent to, and in thermally responsive relation to, a heating element 11 that is connected in series with the main conductor from the bus circuit 4 to the motor 2. When the heating element 11 heats the bimetal bar 10 to an extent dependent upon a sustained excessive overload condition on the motor 2, the bimetal bar 10 moves from its normal position to operate and release a spring biased tripping latch 12. As schematically illustrated, the trip latch 12 is biased downward against the bimetal elements by a compression spring 13 at one end of the latch. That end of the latch 12 is held against lateral displacement, by a bracket 14, but in such manner as to permit the latch to oscillate to a limited extent about that upper end.

A spring 17, anchored at one end and connected at its other end to the latch 12, tends to move the trip latch 12 laterally, but the lower end of the latch 12 is normally restrained against such movement by a stationary bracket 18 as a barrier, until the trip latch 12 is raised by one or both of the bimetal elements 10 over the bracket 18.

When the latch 12 is raised to releasing position over the barrier bracket 18, and is then moved laterally by the spring 17, the latch engages and rotates a pivoted contact arm 19 to separate a bridging contact 20 from two associated stationary contact members 21 and 22, to de-energize the holding coil 23 of the contactor 6 to permit the contactor 6 to open.

In order to provide a proper degree of protection for each motor, the thermally actuated current responsive device 7 should be set to correspond to the capacity of the motor, and substantially to the normal heating conditions of the motor.

Additional circuits 25 and 26 are shown to indicate circuits to the motors for other rolls.

To provide individual control for each motor 1, a push-button starting switch 27 is disposed to complete the energizing circuit for the operating coil 23 of the contactor 6. An interlock contact 28, on each contactor 6, is connected to bridge the push-button switch 27 to provide a holding circuit for the coil 23 when switch 19 is released.

After a group of motors has been operating to move the traveling material along the roll table, and it is desired to stop the material, and, therefore, to stop the motors, present effective practice is to disconnect the source 3 of alternating current energy from the bus circuit to the motors and to connect a direct current circuit 30 through a circuit interrupter 31 to one phase of the bus to the motors, to establish a dynamic braking action to bring the motors to a quick stop. In view of the high speeds at which the motors are operated, and the consequent storing of kinetic energy in the rolls, the dynamic braking current from direct current circuit 30 necessary to stop the motors, may at times be quite large. In order to prevent such suddenly imposed and relatively large direct currents from heating the bimetal bars 10, beyond their normal operating temperatures, to temperatures sufficiently high to operate the relay 7, I provide a reactor 33 in shunt relationship with each heating element 11 that is associated with each bimetal bar of the relays for the respective motors.

The characteristics of the reactor 33 are made such as to provide a relatively high impedance to the normal load current at the system frequency. As shown in the vector circle diagram of Fig. 2, the load current 34 of each motor 2 resolves itself into a reactor current component 35, and a resistor current component 36 which will be in quadrature relation with the reactor current 35. The resistor current 36 through the heating element 11 will thus be but very little less than the entire load current to the motor, under normal operating conditions.

On the other hand, when the alternating current circuit 3 is disconnected from the bus 4 and the direct current circuit 30 is connected to one phase of the bus system, to energize the corresponding phase of each of the motors, such dynamic-braking direct current will be substantially sub-divided between the reactor 33 and the heating element 11, according to their respective resistances. The current through the heating element 11 will be less than the normal maximum load current for which the bimetal bar is adjusted, and the heating element will therefore not be energized sufficiently to acuate the tripping latch 12.

By so sub-dividing the direct current, false operation of the motor switch 6 is prevented when the dynamic braking direct current is applied for the short time necessary to stop the motor. At the same time, the normal close setting of the protective device for the motor switch remains relatively unaffected, and proper protection for the motors is retained.

In order to prevent short-circuiting of the alternating and the direct current sources 3 and 30, upon each other, through the bus 4; the two main breakers 5 and 31 are interlocked to permit only one breaker to be closed at the same time. The operating coil 37 of breaker 5 is energized from a control circuit 38 through interlock push-button switch 39 and interlock contact 40 on direct current breaker 31.

When the push-button switch 39 is closed, its associated interlocked switch 41 for the direct current breaker 31 is open. When the motors are to be stopped, the switch 39 is opened, and switch 41 closed, by its push-button 42, to open the circuit of the holding coil 37 of breaker 5, and to close the circuit of the operating and holding coil 43 of the breaker 31. The circuit for the coil 43 of breaker 31 passes through interlock switch 44 on the breaker 5. Thus, breakers 5 and 31 are interlocked so that either one can be closed only when the other is open.

By means of the reactors 33 to present a high impedance to the alternating load current of normal frequency, relative to the dynamic braking direct current, the load current is substantially entirely confined to the heating element, while the dynamic braking current is sub-divided between the heating element and the reactor to an extent that energizes the bimetal less than enough to operate the thermal relay.

The relay thus protects the motor during normal operation, but does not operate to disconnect its motor during dynamic braking.

My invention is not limited to the specific details of construction or of the arrangements that are illustrated, since they may be variously modified without departing from the spirit and scope of my invention, as set forth in the appended claims.

I claim as my invention:

1. The combination with a plurality of rolls in a roll out table, an alternating current motor for each roll, a common supply line for all of the motors, a source of alternating current, and a breaker to connect the alternating source to the supply line, of an overload protective device connected between the supply line and each motor to protect the motor against overload and to disconnect it when abnormally loaded or overheated, a source of direct current, a breaker to connect the direct current source to the supply line to establish dynamic braking of the motors, and means associated with each overload device to by-pass the dynamic braking current around the overload devices and to confine the alternating current to the overload device.

2. The combination with a plurality of rolls in a roll out table, an alternating current motor for each roll, a common supply line for all of the motors, a source of alternating current, and a circuit breaker to connect the alternating source to the supply line, of an overload protective device connected between the supply line and each motor to protect the motor against overload and to disconnect it when abnormally loaded or overheated, a source of direct current, a breaker to connect the direct current source to the supply line to establish dynamic braking of the motors, and a reactor of high impedance to the alternating current connected to shunt each overload device to present a path of low impedance to the direct dynamic braking current to prevent the braking current from operating the overload devices.

3. The combination with a plurality of rolls in a roll out table, an alternating current motor for each roll, a common supply line for all of the motors, a source of alternating current, and a breaker to connect the alternating source to the supply line, of an overload protective device connected between the supply line and each motor to protect the motor against overload and to disconnect it when abnormally loaded or overheated, a source of direct current, a breaker to connect the direct current source to the supply line to establish dynamic braking of the motors, and an impedance device connected in shunt with each overload device to present a high impedance to the alternating current to restrict that current substantially entirely to the overload devices, and to present a low impedance path to the direct current to thus restrict the braking current substantially entirely to the impedance device connected in shunt with the overload device.

4. In a protective system for an alternating current motor, the combination with a supply circuit and a main switch to connect the motor to the circuit and embodying a current responsive device for tripping the switch open in response to abnormal conditions in the motor; of a direct current source, means for supplying direct current to the motor through the main switch to establish a dynamic braking action on the motor, and means associated with the current-responsive device of the main switch for selectively confining substantially all of the alternating current to the current-responsive device but providing a by-pass path for a substantial portion of the direct current to prevent false operation of the main switch by the direct current.

5. In a protective system for an alternating current motor, the combination with a supply circuit and a main switch to connect the motor to the circuit and embodying a current responsive device for tripping the switch open in response to abnormal conditions in the motor; of a direct current source, means for supplying direct current to the motor through the main switch to establish a dynamic braking action on the motor, and means serving as a current-conducting circuit bridging the current-responsive device, said circuit having a high impedance to the alternating current and serving thereby to confine the alternating load current to the current-responsive device to enable said device to control the switch according to the load setting of the device, said circuit having a low impedance to direct current and serving to by-pass sufficient dynamic braking current around the current-responsive device to keep the current traversing said device below the operating setting, so the operating setting may be kept low enough to provide proper protection against excessive alternating load currents.

6. The combination with an alternating current motor for a roll-out table roll, of a source of alternating current energy for the motor, a circuit breaker for connecting the motor to the source, a starting switch for the motor and embodying a protective device to safeguard the motor against operating under excessive loads by disconnecting the motor at the starting switch, a source of direct current to provide dynamic braking energy for the motor, a breaker to connect the direct current source to one phase of the motor, an interlock between the brakers to permit only one breaker to be closed at a time, and means for modifying the operation of the protective device to permit it to respond to the full value of the operating alternating current, but to prevent it from responding to the full value of the dynamic braking direct current.

JAY R. WRATHALL.